Sept. 25, 1962     J. E. BIGELOW     3,056,026
CIGARETTE DENSITY GAGE
Filed May 11, 1959     3 Sheets-Sheet 1

INVENTOR.
JOHN E. BIGELOW
BY *Ralph G. Hohenfeldt*

ATTORNEY

Sept. 25, 1962

J. E. BIGELOW 3,056,026

CIGARETTE DENSITY GAGE

Filed May 11, 1959

*INVENTOR.*
JOHN E. BIGELOW

BY *Ralph G. Hohenfeldt*

ATTORNEY

Sept. 25, 1962
J. E. BIGELOW
3,056,026
CIGARETTE DENSITY GAGE
Filed May 11, 1959
3 Sheets-Sheet 3

INVENTOR.
JOHN E. BIGELOW
BY
ATTORNEY

United States Patent Office 3,056,026
Patented Sept. 25, 1962

3,056,026
CIGARETTE DENSITY GAGE
John E. Bigelow, Hales Corners, Wis., assignor to General Electric Company, a corporation of New York
Filed May 11, 1959, Ser. No. 812,155
6 Claims. (Cl. 250—83.3)

This invention relates to apparatus for continuously gaging and controlling the density of moving rod material. In greater particularity, the invention concerns an X-ray gage for holding uniform the density or weight of cigarette rod as it is formed in a cigarette machine.

Cigarette gages that rely upon measuring variations in beta ray transmission from a radioactive isotope are well known and have enjoyed considerable success. However, they are always subject to the disadvantage and danger of contaminating the substance being gaged with harmful radioactivity and to the inconvenience of observing special precautions when handling the radioactive isotope. Moreover, radioactive sources cannot be turned on and off when not in use so the danger element is always present whether or not the gage is operating.

Substitution of an X-ray source for a radioactive isotope has long been considered highly desirable by those versed in the art of gaging, but previous experience with gaging low density materials such as tobacco has not been fully successful. This is so, in part, because X-ray sources produce a polychromatic spectrum of radiation including a range of wave lengths varying in penetrating power and quantity. Also, X-radiation absorbed by a cylindrical low density rod of tobacco or the like bears an extremely non-linear relationship to its weight per unit area at low tube voltages and, although more nearly linear at extremely high voltages, the change in absorption is then so small for incremental density changes that known sensing and amplifying apparatus are subject to greater inherent drift than the magnitude being measured. Moreover, even though an X-ray tube produces a fairly uniform radiation field and known ion chambers respond to the radiation in a manner considered uniform enough for most purposes, they are not ordinarily uniform enough for gaging a tobacco rod because merely moving the rod without changing the amount presented to the beam caused changes in absorption being measured that exceeds and camouflages the small density changes expected between different unit lengths of the rod.

The present invention has avoided the disadvantages of beta ray gages and has successfully overcome the obstacles to gaging cigarette tobacco rod with an X-ray gage. Achieving this end will be manifested in the following objects and ensuing description of the invention.

It is a general object of the present invention to provide a new and improved cigarette rod density gage.

Another object is to provide a cigarette rod gage that relies upon variations in X-ray absorption as an indication of density differences and to use a signal so produced to control the tobacco being fed into the machine.

Another important object is to provide a novel arrangement and configuration of the components in an X-ray gaging system which yields optimum sensitivity and accuracy but which is relatively unaffected by minor changes in the physical position of the rod being gaged.

Another object is to provide a novel means for calibrating a cigarette gage so as to establish a true comparison between the radiation intensity and absorption in the reference X-ray beam with the same characteristics in the beam passing through the sample under measurement.

Still another object is to relate the X-ray tube characteristic with proper filters, apertures, aperture adjustment means, absorption means and means for their adjustment to the end that the gaging system is especially sensitive and accurate for gaging relatively small density variations in a low density substance such as the tobacco in a moving cigarette rod.

In general terms, the present invention involves a cigarette rod making machine whose product is passed through an X-ray gage head that provides the intelligence for controlling the amount of tobacco in the rod. The gage head includes an X-ray generator tube located above a passageway through which the cigarette rod moves and that is operated in an optimum voltage range to be discussed later. The X-ray beam from the tube is divided into two portions, a sample beam passing through the cigarette rod whose density is to be measured, and a reference beam whose characteristics are uniquely controlled in order to validate its comparison with the cigarette rod or sample beam. Also included in the scheme is a dual aperture plate with one aperture defining each part of the beam mentioned above and where the aperture in the portion of the beam passing through the rod being gaged has a particular trapezoidal shape, in a preferred embodiment, especially calculated to account for lateral shifting of the rod and to maintain the radiation falling on a detector uniform except upon occurrence of actual variations in the rod density.

Also included in the scheme is a difference signal amplifier which through a conventional electronic regulator controls a variable drive apparatus for altering the amount of tobacco fed into the cigarette rod in accordance with density variations of the cigarette rod being gaged.

The specification will now proceed with a more detailed discussion of the invention in conjunction with the drawings in which.

Figure 1:
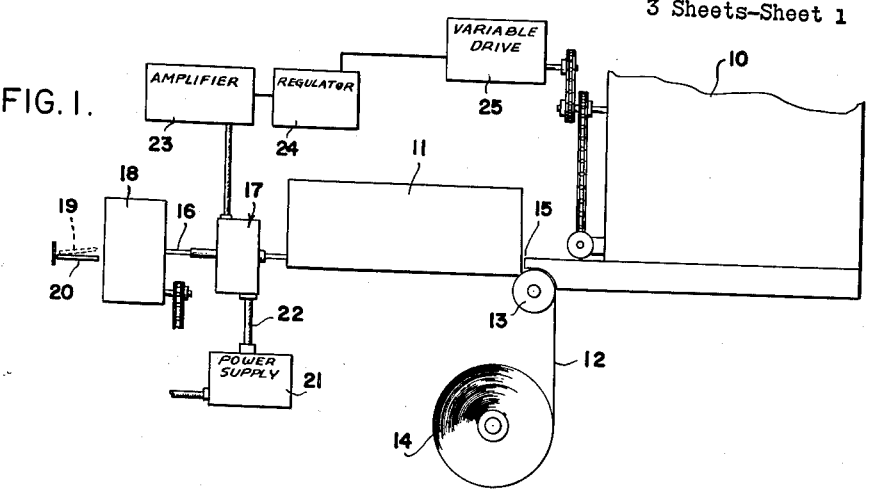
FIG. 1 is a schematic diagram showing the essential elements of a cigarette making machine array incorporating the invention.

Attention is now invited to FIG. 1 which schematically shows the principal elements of a continuous rod cigarette making machine to which the invention and its accessories are adapted. The machine comprises a tobacco feed mechanism 10 and a symbolized cigarette maker designated generally by the reference numeral 11. A continuous paper strip 12 is fed over a roller 13 into cigarette maker 11 from a reel 14 as indicated. Drive mechanism and tension controlling devices for the paper strip 12 are omitted for the sake of simplicity.

Paper strip 12 has a width corresponding with the circumference of the cigarette rod plus sufficient overlap. Tobacco is deposited on strip 12 in a region over roller 13 from a discharge opening in the vicinity of the reference numeral 15. The paper supported tobacco progresses through cigarette maker 11 at the rate of approximately 5 feet per second at which time it is formed into a cylinder, pasted and discharged as a continuous rod 16.

It then passes through the novel cigarette density gage head 17 and into a cutoff machine 18, whereupon individual cigarettes 19 are dropped onto a conveyor belt 20 and carried away.

Also shown in FIG. 1 is a symbolically represented power supply 21 for energizing X-ray gage head 17 through a cable 22. The error signal from X-ray gage 17 is conducted to an amplifier 23 which, in turn, provides intelligence to a regulator 24 that controls a variable drive 25, and accordingly, the amount of tobacco deposited on paper 12 in response to the density controlling signals from the gage head 17.

Those who are interested may see further details on cigarette making machines in U.S. Patent No. 2,861,683 and patents and applications cited therein.

Figure 2:
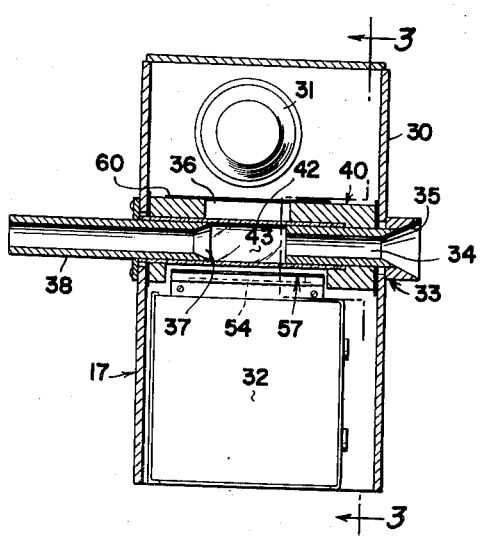
FIG. 2 is a front vertical sectional view of the novel X-ray gage head, with parts broken away.

Attention is now turned to FIG. 2 and ensuing figures for a more detailed discussion of the gage head 17. It is seen to comprise a housing 30 which serves, among other things, to shield stray radiation from an X-ray tube 31 located near the top of its interior. In the bottom region of housing 30 there is located a dual ion chamber 32 for measuring the X-radiation in the sample or cigarette rod beam and also in the reference beam, and comparing the electric signals produced by each of the beams in a manner which will be described in greater detail hereafter. Of course, other forms of detectors or photon counters might be used instead of the ion chamber to measure, compare and produce a difference signal in accordance with variations in the sample beam.

Figure 3:
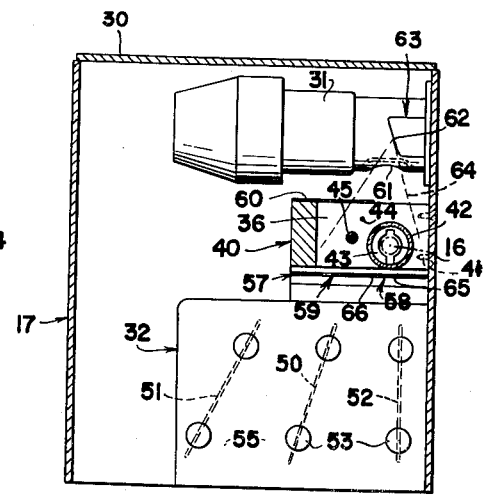
FIG. 3 is a right side elevational view of the gage head, partly in section, taken on the line 3—3 in FIG. 2.

The moving cigarette rod sample 16 shown in FIG. 3, passes through gage head 17 in a horizontal plane. Rod 16 is rather closely guided into the gage head by an adit guide which may be steel and includes a sleeve portion 33 whose internal bore 34, see FIG. 2, surrounds the cigarette rod and which commences with a tapered conical entrance 35. Rod 16 traverses a gap 36 after which it is admitted to the tapered mouth 37 of an exit guide sleeve 38, whereupon the rod enters the cutoff machine 18 as can be seen in FIG. 1.

Figure 5:
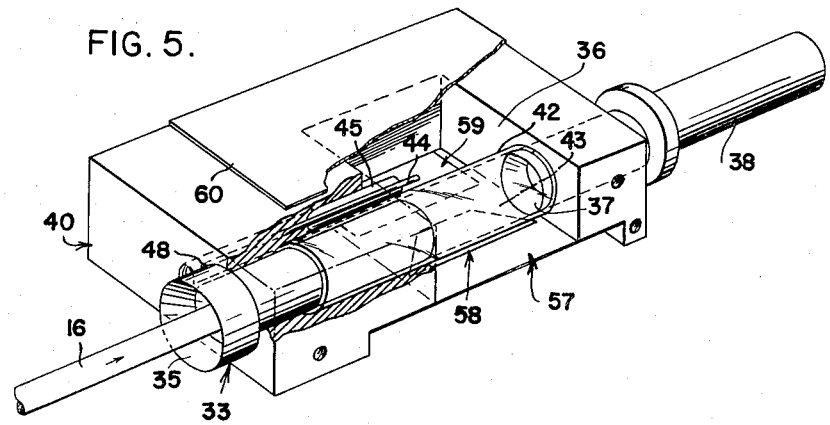
FIG. 5 is an isometric view of a gage guide block, looking at it from the back, with parts broken away, and showing the cigarette rod passageway, the filters, calibrating means and the apertures of the X-ray system in the present invention.

Interiorly of housing 30, adit guide 33 and exit guide 38 are supported in an appropriately bored guide block 40 that can be seen in greater detail in FIG. 5. Guide block 40 is supported over ion chamber 32 in housing 30 on flat head screws 41 through the back of the housing.

The gap 36, across which cigarette rod 16 passes, is bridged by a transparent tube 42 that slides over each of the guide sleeves 33 and 38 and defines an enclosed, cylindrical chamber 43 for the cigarette rod. Tube 42 may be made of an acrylic resin like methyl methacrylate sold under the trademarks Lucite or Plexiglas, or any material of similarly low density and low X-ray absorption characteristics.

Thus, the cigarette rod 16 passes through gage head 17 in a continuous, closed cylindrical passageway to which an air blast may be admitted for expelling loose particles of tobacco that might accumulate therein.

Gage block 40 may be made of a low density metal such as aluminum since it will not transmit the comparatively soft radiation used in this gage head. It will be seen, particularly in FIG. 5, that the gage block has its medial portion milled out to form the gap or window 36 for allowing passage of the beam of radiation from tube 31.

Laterally spaced from plastic tube 42 in the reference beam, or the part of the beam which does not pass through the cigarette rod 16, guide block 40 carries a pair of rods 44 and 45. Rod 44 is preferably of an X-ray impervious material such as brass and it is adapted to being advanced and retracted in gap 36 by virtue of it being provided with a partial screw thread, not shown, in an oversize region where it penetrates guide block 40. For adjustment it is provided with a screwdriver slot that is accessible through threaded hole 48 in the side of the gage block. Metal rod 44 is disposed in the part of the X-ray beam which does not pass through the cigarette rod and which acts as a reference beam for simulating X-ray intensity and absorption of the cigarette rod under inspection. In this illustrative example, brass rod 44 may have a diameter of approximately three-sixteenths of an inch where it is exposed in the reference beam.

Also extending into the window slightly to the side of the rod just described, is the plastic absorption calibrating rod means or tube 45. In this case an acrylic resin tube is used with an outside diameter of 0.315 inch and a bore of thirteen-sixty-fourths inch. Plastic member 45 may be threaded in an oversize region in the manner of the other rod to facilitate its advancement and retraction in and out of the reference X-ray beam, and accordingly, gap 36.

Thus far, we have seen how the X-ray beam from X-ray generator tube 31 is projected in definable paths, one, called the sample beam, through the cigarette rod being gaged, and another, called the reference beam, that illuminates with X-radiation a metal rod 44 and a plastic rod 45 in the calibrating portion of the system. Immediately below guide block 40 there is located an ion chamber 32 of the two balancing section type that intercepts and measures the radiant energy in the reference and sample beams.

Figure 6:
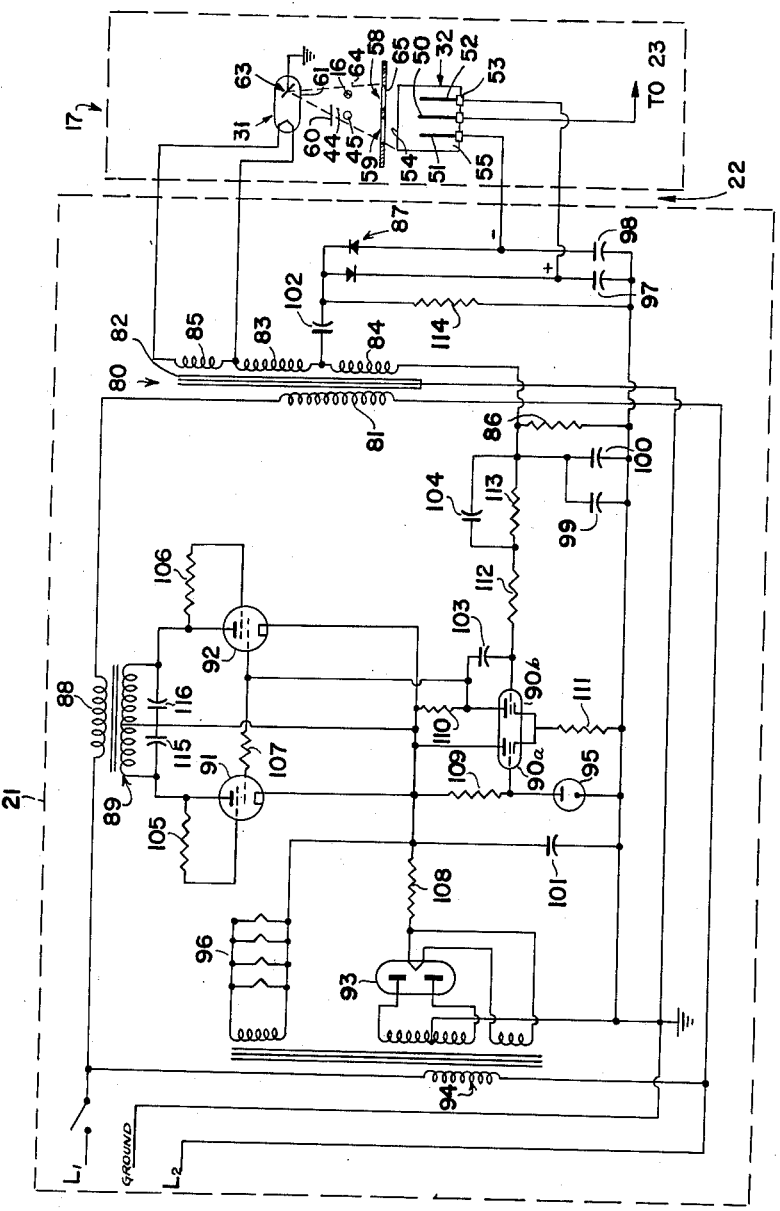
FIG. 6 is a schematic wiring diagram of the essential electrical components of the invention.

Because ion chamber 32 is substantially conventional it will not be discussed in detail except to say that by referring to FIGS. 3 and 6 it can be seen to include a central electrode 50 from which a difference signal is taken. On opposite sides of electrode 50 are oppositely polarized plates, one identified by the numeral 51 which may be negatively charged to around six hundred volts and the other 52 which may be postively charged to an equal magnitude. The plates may be shaped other than planar from the way they appear as hidden lines in FIG. 3 or schematically in FIG. 6 and they may be supported on insulated bushings 53 which also allow connecting an external lead wire to each of them. Radiation enters chamber 32 through a window 54 at its top, see FIG. 2. Window 54 is preferably a thin aluminum sheet a few thousandths of an inch thick or it may be beryllium or other low atomic number metal, or even glass or plastic. The radiation which enters the chamber produces ionization of the gas filling, 55, which is preferably argon at 50 cm. mercury pressure. The electric fields of the charged electrodes collect their ions to produce a current. The ion currents from the reference and sample beams are directly subtracted in the ion chamber 32 and no net signal is derived if the beams are of equal photon energy. On the other hand, if the density of cigarette rod 16 changes, a net difference signal is put out from electrode 50 and this is the intelligence that ultimately corrects the tobacco feed 10 to restore rod density to normal.

Figure 4:
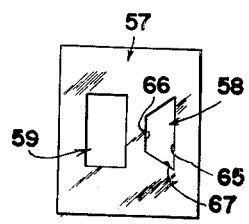
FIG. 4 is an enlarged plan view of an aperture plate used in the gage head as it appears when viewed from the top in FIG. 3.

Immediately underneath guide block 40 and surrounding ion chamber 32 there is provided a plate 57 with suitable apertures for passing and causing division of the beams discussed above. An enlarged plan view of plate 57 may be seen in FIG. 4, and in conjunction with FIGS. 3 and 6 it is evident that radiation passing through the cigarette rod 16 also passes through the trapezoidal aperture 58 while the reference beam passes through a rectangular aperture 59 on the way to the ion chamber 32. It should be noted also that, for reasons which will be given later, carried on top of guide block 40 in the reference beam only is a thin balancing filter 60 in the form of an aluminum sheet .015 inch thick. It should also be noted, see FIG. 3, that the X-ray tube 31 is provided with a somewhat unconventional window 61 which preferably consists in a titanium sheet .002 inch thick. Thus, in the reference beam, between the ion chamber gas 55 and the focal spot 62 on target 63 of the X-ray tube 31 there are intervening the aluminum filter 60, metal rod 44, plastic rod 45 and aperture plate 57 with its rectangular hole 59. With the titanium window and other elements, just recited, in the reference beam, when the tube is operated with an anode voltage whose peak amplitude is around 27 kilovolts, or in the range between 25 to 30 peak kilovolts, a radiation effect is yielded which compares quite closely with the effect produced by the cigarette rod and the plastic tube 42 which surrounds it.

To match the reference beam intensity with the cigarette rod beam, brass rod 44 may be screwed in and out to vary the shadow which it casts on the rectangular reference beam aperture 59. To match the absorption of the reference beam with that of the cigarette rod beam, plastic rod or tube 45 is advanced or retracted.

The trapezoidal shape of the cigarette rod beam aperture 58 is a particularly important feature in successfully gaging tobacco density with X-radiation. As indicated earlier, cigarette rod 16 goes through the gage head while being fairly closely confined by guide sleeves 33 and 38, but there are limitations on the amount of guidance that can be given because of the softness of the rod being gaged. Consequently, the cigarette rod 16 while moving at a very high rate of speed with some radial clearance may vibrate or shift back and forth in a horizontal plane in parallelism with aperture plate 57 and transversely to the general longitudinal direction in which the cigarette rod 16 travels. The effects of this lateral movement are aggravated by the fact that the cone of radiation emitted from tube target 63 is not perfectly uniform across its diameter insofar as quality or quantity of radiation is concerned, the least intense beam zone being that which emanates from the beam spot on the heel side of the anode and whose boundary is indicated by the broken line identified by reference numeral 64, see FIGS. 3 and 6. In addition, the ion chambers response is not absolutely uniform over its entire window. It should be noted that the zone of lesser output, due to non-uniformities of tube and chamber, passing through the cigarette rod 16 falls on trapezoidal aperture 58 nearest to its wide base margin 65 or all along its greatest longitudinal dimension. On the other hand, the output increases slightly along the altitude of the trapezoid where it becomes substantially uniform as one proceeds from right to left in FIG. 3 to beyond the shorter parallel side 66 of aperture 58. To compensate for the beam intensity and ion chamber variations, trapezoidal aperture 58 has angular ends 67 for reducing the length dimension of cigarette rod 16 presented to the beam as the rod shifts toward the short parallel side 66. Hence, the total effect on output of the sample beam caused by attenuation by a uniform rod is practically constant regardless of where the rod 16 crosses the aperture 58. The discovery of this configuration resulted in a great increase in the consistency and accuracy of the gage. As shown, aperture 58 is an isosceles trapezoid but circumstances are conceivable where an irregular trapezoidal aperture or one having some other variation in its length dimension without departing from the spirit of the invention. To be more specific in this illustration, the base side 65 is 1.250 inches and the parallel side 66 is 0.65 inch. The altitude of the aperture is 0.44 inch. Rectangular aperture 59 has the same length but a width of 0.56 inch.

Figure 7:
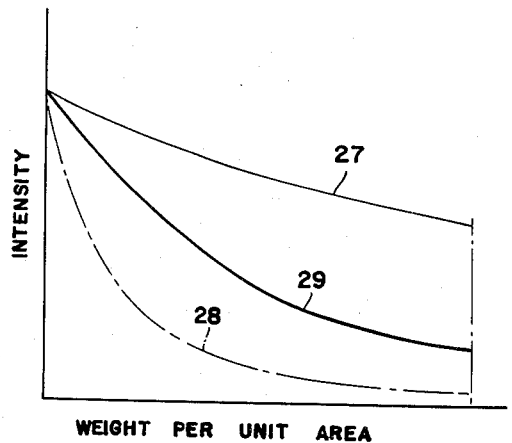
FIG. 7 is a graph showing the relationship between X-ray beam intensity and weight per unit area of the cigarette rod for various voltages that might be applied to the X-ray tube.

As intimated earlier, a requisite for a successfully operating cigarette gage is to attain optimum parameters to get the most linear response from the ion chambers for corresponding variations in density and position of the cigarette rod being gaged. The geometry of the elements thus far described contributes to that general purpose. Another important consideration is the peak voltage at which the X-ray generator tube 31 operates, bearing in mind, that as is evident from curve 27 in FIG. 7 when tube voltage is high, linearity between rod density and intensity are good but the change in intensity is so small as to not be accurately measurable by the ion chamber. On the other hand, at extremely low tube voltages, curve 28 in FIG. 7, linearity is poor but the change in weight per unit area of the cigarette rod corresponds with a sharp change in intensity of the radiation passing through, and accordingly, a more easily measurable intensity difference occurs. Applicant found that the inherent variations in thickness of a cigarette rod, due to its circularity, could be accounted for with the least error when the effective energy of the measured X-radiation was in the range of 17 kilovolts as represented by curve 29 in FIG. 7. To obtain this effective energy an X-ray tube 31 with a copper target 63 is operated at approximately 27 peak kilovolts and in conjunction with titanium tube window 31, aluminum filter 60, plastic absorption control rod 45, chamber window 54, and gas 55 the reference beam closely duplicates the energy distribution spectrum through the cigarette rod. The filtering of titanium tube window 31, of course, effectively eliminates the extremely soft copper characteristic radiation from anode 63. The wavelength of copper characteristic radiation is excited with a tube voltage of approximately 8 kilovolts.

Schematic diagrams of the X-ray generator power supply 21 and gage head 17 are shown in FIG. 6. All wires spanning between 21 and 17 may, for sake of simplicity, be considered included in a high voltage cable such as 22, see FIG. 1, but separate cables are frequently employed for different wires. In the power supply 21 is a high voltage transformer 80 that has a primary winding 81 whose voltage is regulated in a manner to be described. On the core 82 are a number of secondary windings. One secondary winding 83 in series with winding 84 impresses high voltage between the cathode and anode 63 of X-ray tube 31 through a resistor 86 which carries the tube current. Anode 63 is at ground potential as indicated. Secondary winding 85 supplies the cathode of the X-ray tube and one of the lines extending from it acts as a return path for the high voltage anode circuit.

The oppositely polarized electrodes 51 and 52 in ion chamber 32 are energized from a diode rectifier generally designated by the numeral 87 in the power unit 21. The output voltage of rectifier 87 is approximately 600 volts D.C. Its alternating input voltage is derived from secondary winding 84. The difference signal produced in ion chamber 32 is in the form of a current to ground from electrode 50 thereof. This signal is conducted to amplifier 23 as indicated.

It is imperative that tube 31 and ion chamber 32 be energized with very stable voltages lest the effects of these possible voltage fluctuations obscure the minute differences in density which are represented by signal changes from the ion chamber. The voltages are held constant by the stabilizing circuit incorporated in unit 21, which will be described later, but to attain sufficient stability in an economical circuit for use in tobacco gaging the high voltage transformer is made in a particular and novel way and special consideration is given to the problem of capacitive loading of the regulating circuit by the high voltage cable 22. This is achieved by putting a small air gap in the otherwise closed transformer core 82 so that the inductive reactance seen on the primary 81 side is slightly in excess of any capacitive effect developed in cable 22, or from the view in FIG. 6, in the wires spanning between power unit 21 and gage head 17. The cable capacity tends to cause a high steady capacitive reactive current in the transformer which is cancelled by the air gap inductive effect. The slightly excess inductive effect, of course, results in the regulator circuit and the transformer primary handling more current, but with the advantage of greater stability. With the inductively overcompensated transformer of the present invention, the capacitive effects are rendered insignificant.

Power unit 21 may be supplied from a 110 volt A.C. source through lines $L_1$ and $L_2$. Safety interlocks signal lights and the like have been omitted from FIG. 6 for the sake of brevity. The power is fed through a series winding 88 of a regulating transformer 89 and the primary winding 81 of the high voltage transformer. The potential across 88 is controlled in a subtractive sense by the stabilizing circuit now to be outlined, and accordingly, the voltage across primary 81 is held constant.

X-ray tube current variations appear as voltage changes across resistor 86. If the X-ray tube 31 current or voltage changes from their normal values of around 0.5 ma. at 30 peak kilovolts the grid voltage of tube 90b will change, causing a change in the grid voltages of both tubes 91 and 92. This will cause the plate current of the last mentioned pair of tubes to change so that a change of voltage drop across transformer 89, in series with high voltage transformer primary 81, will occur. The voltage on 81 will change in the proper direction to re-establish the X-ray tube 31 current at preferred value. Since X-ray tube current changes as about the tenth power of filament voltage, all secondary voltages of transformer 80 will have been re-established also.

Tube 93 is a rectifier which supplies D.C. operating voltages to other tubes in the stabilizer portion of the power unit. It is supplied by transformer 94 which also provides cathode heater power to the collectively shown heaters 96 of the various tubes.

Tube 95 is a voltage reference tube which acts through tube 90a, to keep the cathode bias on tube 90b constant. Tube 90a may be considered, for practical purposes, as a cathode follower whose grid potential is constant, supplied from tube 95, and whose cathode potential therefore remains constant.

The character and value of the various circuit components of interest are enumerated below in correspondence with the reference numerals assigned to them in the drawing:

86, resistor, 150,000 ohms, 1 w.
87, rectifier diodes, Sarkes-Tarzian Cat. 026–100 HQ
90, tube, Type 12AX7
91, tube, Type 1614
92, tube, Type 1614
93, tube, Type 5Y3FT
95, tube, Type 5651
97—98, capacitors, .05 mfd. 1600 v. D.C.
99—100, capacitors, .47 mfd. 400 v.
101, capacitor, 10 mfd. 450 v.
102, capacitor, .005 mfd. 1000 v.
103, capacitor, .1 mfd. 600 v.
104, capacitor, .1 mfd. 200 v.
105—106, resistor, 3300 ohms, 1 w.
107, resistor, 47,000 ohms, ½ w.
108, resistor, 4700 ohms, 1 w.
109, resistor, 100,000 ohms, 1 w.
110, resistor, 220,000 ohms, ½ w.
111, resistor, 150,000 ohms, ½ w.
112, resistor, 470,000 ohms, ½ w.
113, resistor, 1 megohm, ½ w.
114, resistor, 1 megohm, 1 w.
115—116, capacitors, .05 mfd. 600 v.

All resistors are of the carbon type with five percent thermal variation.

It should now be apparent that the X-ray controlled cigarette rod density gage hereinabove described accounts for and solves the problems incident to sensing exceedingly small density variations in rapidly moving cigarette rod in an X-ray spectrum that is not perfectly uniform but which apparatus accounts for the non-uniformity by using an optimum effective voltage on the X-ray tube and a novel arrangement of unusually configured elements that yield the desired gaging accuracy and sensitivity. In addition, the electrical portions of the inventive array include an inductively overcompensated power supply which eliminates the usual sensing circuit drift and contributes to a successful tobacco gaging combination. Although a preferred embodiment of the invention has been described in such detail as to facilitate reproduction by those versed in the art, such description is to be considered illustrative rather than limiting, for the invention may be altered somewhat without departing from its fundamental concepts and it is to be construed according to the scope of the claims which follow.

It is claimed:

1. Apparatus for continuously gaging density variations in a cigarette rod moving principally in the direction of its longitudinal axis comprising an X-ray source whose radiation beam varies in intensity laterally of the cigarette rod, X-ray detector means spaced remotely from the source for intercepting radiation therefrom, aperture plate means in proximity with the detector means and having margins defining an aperture and a substantially trapezoidal aperture which divide the X-radiation impinging on the detector means into reference and sample beams respectively, said trapezoidal aperture having its longest side in a beam zone of lesser intensity and the side opposite thereof displaced in the direction toward a more intense beam zone, means guiding and exposing a portion of cigarette rod through the sample beam on the source side of the trapezoidal aperture means, said cigarette rod having freedom to shift laterally a limited distance in directions across the trapezoidal aperture whereupon a shorter length of rod effectively transmits radiation in the most intense beam zone to compensate for the lateral shift, an X-ray impervious means adjustable in the reference beam to control the effective opening of the reference beam aperture, a cylindrical member having low X-ray absorption characteristics adjustably positionable in the reference beam to match the absorption characteristic of the cigarette rod in the sample beam, whereby X-ray variations of the sample beam due to density variations in the cigarette rod produces in the detector means a difference signal with respect to the reference beam.

2. The invention set forth in claim 1 including an X-ray filter interposed between said source and said adjustable means respectively in the path of said reference beam to match the radiation reaching the detector means in the reference beam with the radiation reaching the detector means in the sample beam.

3. The invention according to claim 1 wherein the adjustable low X-ray absorption member comprises an acrylic resin.

4. Apparatus for continuously gaging density variations in a cigarette rod moving principally in a longitudinal direction comprising an X-ray source whose beam of radiation differs in intensity across its diameter in a direction transverse to the principal direction of rod movement, aperture plate means remotely spaced from the source means and embracing a reference beam aperture and a trapezoidal sample beam aperture whose length varies across its width, said apertures dividing said beam into reference and sample beams respectively that are individually measured in the detector means to produce a difference signal, tobacco feed means and means responsive to said difference signal for controlling said tobacco feed means and thereby the density of the cigarette rod, said sample beam aperture having its longest dimension in the beam zone of lesser intensity and the side opposite thereof displaced in a direction of a more intense beam zone, means guiding and exposing a portion of said cigarette rod through the sample beam on the source side of said aperture plate means, said cigarette rod having freedom to shift laterally in a limited amount in directions across the sample beam aperture, whereupon a shorter length of cigarette rod effectively absorbs radiation in the more intense beam zone and the detected beam variations due to lateral shift of the rod is thereby compensated.

5. The invention set forth in claim 4 wherein said guide means includes an acrylic resin tubular means surrounding that portion of the cigarette rod exposed to the sample beam.

6. Apparatus for continuously gaging the density of a cigarette rod moving principally in a longitudinal direction comprising an X-ray tube emitting a polychromatic beam of rays, said source including an anode to which is applied a voltage in the range of 25 to 30 peak kilovolts and from which said beam emanates, a window of low atomic number metal in said tube for filtering the least energetic rays from said beam, detector means spaced from the window for intercepting said beam, aperture plate means adjacent said detector means and embracing a pair of apertures for dividing the beam into a reference beam and sample beam, an aluminum filter disposed in the reference beam adjacent the window, an X-ray impervious rod means intervening between said filter and reference beam aperture and adjustably positionable to vary the effective X-ray transmission area of said aperture, an acrylic resin rod means adjacent said X-ray impervious rod means and adjustably positionable in said reference beam to match the X-radiation absorbed with the desired absorption in the sample beam, means guiding and exposing a portion of a moving cigarette rod in said sample beam in substantial parallelism with said sample beam aperture, the absorption by the aforesaid elements imposed in the sample and reference beams between the X-ray tube anode and the interior of the detector means resulting in measurement of radiation having an effective equivalent energy value of substantially 17 kilovolts.

References Cited in the file of this patent

UNITED STATES PATENTS

| | | |
|---|---|---|
| 2,469,206 | Rich | May 3, 1949 |
| 2,503,075 | Smith | Apr. 4, 1950 |
| 2,641,034 | Harter | June 9, 1953 |
| 2,737,186 | Molins | Mar. 6, 1956 |
| 2,831,980 | Howell | Apr. 22, 1958 |
| 2,914,676 | Dijkstra | Nov. 24, 1959 |

FOREIGN PATENTS

| | | |
|---|---|---|
| 738,329 | Great Britain | Oct. 12, 1955 |